United States Patent [19]

Randall

[11] Patent Number: 5,342,590

[45] Date of Patent: * Aug. 30, 1994

[54] METHOD OF MAKING ALKALI METAL STANNATES

[75] Inventor: David J. Randall, London, England

[73] Assignee: Alcan International Limited, Montreal, Canada

[*] Notice: The portion of the term of this patent subsequent to May 11, 2010 has been disclaimed.

[21] Appl. No.: 807,870

[22] Filed: Feb. 24, 1992

[30] Foreign Application Priority Data

Jul. 21, 1990 [GB] United Kingdom ............ 8916673.0

[51] Int. Cl.⁵ .............................................. C01C 19/02
[52] U.S. Cl. ........................................ 423/89; 423/93
[58] Field of Search .................. 423/89, 92, 93, 98, 423/90, 618, 183, 184, 171

[56] References Cited

U.S. PATENT DOCUMENTS

| 1,811,142 | 10/1928 | Little | 423/92 |
| 4,291,009 | 9/1981 | Franks, Jr. | |
| 4,737,351 | 4/1988 | Krajewski | 423/98 |

FOREIGN PATENT DOCUMENTS

| 1214045 | 11/1986 | Canada . |
| 57-5829 | 1/1982 | Japan . |
| 630112422 | 10/1986 | Japan . |
| 7007427 | 11/1971 | Netherlands . |

OTHER PUBLICATIONS

Chemical Abstracts, vol. 107, No. 22, (Nov. 1987), Abstract Nos. 201495s.

*Primary Examiner*—David Brunsman
*Attorney, Agent, or Firm*—Cooper & Dunham

[57] ABSTRACT

The invention provides a method of making alkali metal stannates which comprises heating a mixture of tin oxide with a solution of alkali under pressure. Preferably a stoichiometric excess of alkali over the tin is used.

7 Claims, No Drawings

METHOD OF MAKING ALKALI METAL STANNATES

Synthetic tin oxide is readily converted to an alkali metal stannate by reaction with sodium or potassium hydroxide. But is well recognised that synthetic tin oxide has different properties and is much more reactive than mineral tin oxide. There have been attempts over at least the last 150 years to convert mineral tin oxide direct to stannate. C. L. Mantell ("Tin" ASC Monograph, Second Edition 1949 pages 157 to 164) attempted to leach cassiterite using a large number of different reagents, but obtained results that did not offer much encouragement for the development of the leaching process. And indeed no commercial leaching process has emerged. Until the present time, commercial methods for making stannates from mineral tin oxide have proceeded via tin metal, either by electrolytic oxidation or via formation of reactive compounds from the metal.

A process which permitted production of soluble stannates directly from mineral tin oxide would be of particular value, in that the expensive reduction to metal and re-oxidation of the conventional processes would both be rendered unnecessary.

This invention provides a method of making an alkali metal stannate which method comprises heating a mixture of mineral tin oxide with a solution of alkali under pressure. The term mineral tin oxide excludes synthetic tin oxides. The best known mineral tin oxide is cassiterite. The tin oxide is preferably used in comminuted form. The solution of alkali is preferably in a protic solvent such as alcohol or particularly water.

An aqueous solution of alkali is preferably sodium or potassium hydroxide. The aqueous solution preferably contains 4 to 60%, particularly 15 to 50%, by weight/volume of alkali hydroxide. If the alkali concentration is too low, reaction is slow or incomplete. If the alkali concentration is too high, stannate is precipitated on to the unreacted cassiterite particles and inhibits further solution. Under suitable conditions, the alkali metal stannate formed remains in solution.

The reaction temperature is preferably at least 200° C., and may be as high as desired up to or even above the critical point of the solution. Particularly preferred 250° to 300° C. The pressure is preferably merely sufficient to prevent the water from boiling off. Reaction time is not critical, but is typically from 30 minutes to several hours.

It is possible to use a stoichiometric excess of cassiterite, and to recycle unreacted solid. Thus for example the reaction mixture may contain 1 to 2 moles of alkali per mole of tin oxide.

After cooling, unreacted tin oxide is removed from the mixture, which may then be dewatered in order to recover the stannate in solid form. The precipitated alkali metal stannate may be washed with cold water in order to recover unused alkali. Alternatively, the aqueous solution comprising stannate and unreacted alkali may be used as it is.

It is preferred to use a stoichiometric excess of alkali. Thus for example the reaction mixture may contain 2 or more moles of alkali per mole of tin oxide.

After cooling, due to the low solubility of stannate in the presence of the excess alkali, the crystalline alkali metal stannate may be filtered from the mother liquor. The mother liquor may then be recycled. The alkali metal stannate can then be further treated to remove contaminating unreacted material prior to use, for example by dissolving the stannate in water.

The following examples illustrate the invention.

EXAMPLE 1

50 g coarse ground Malaysian cassiterite was autoclaved with 81 g pearl caustic soda and 800 ml deionised water. The mixture was agitated and heated from ambient temperature to 238° C. over 165 minutes. At the end of this time the autoclave pressure was 14.5 MPa. The autoclave was vented slowly to atmosphere and allowed to cool overnight.

A concentrated liquor together with some unreacted cassiterite was formed. In addition to coarse unreacted cassiterite, there was a fine iron precipitate which settled on standing. On cooling the supernatant liquid, platey crystals of sodium stannate separated out an were identified by x-ray diffraction after washing with acetone.

Some 20 g of sodium stannate were recovered plus 8 g unreacted cassiterite and 149 g caustic liquor.

EXAMPLE 2

Table 1 shows results of further trials using the method of the present invention, conditions were as given in the table.

Highest yields per unit volume were achieved with ground cassiterite at 300° C. and 50% w/w NaOH (Expt No. 6). Under these conditions essentially complete dissolution was achieved over 5 hours with a 7.3% residue equivalent to a tin extraction of 11.8% w/v of the room temperature reaction volume. Based on the chemical composition of the ore and the XRD analyses of the residues this corresponds to essentially 100% extraction of tin oxide.

TABLE 1

RESULT OF EXTRACTION TRIALS

| EXPT | CASS g | TEMP °C. | TIME HRS | g NaOH | g H$_2$O | % EXTRACTION | CASS TYPE |
|---|---|---|---|---|---|---|---|
| 1 | 100.0 | 300 | 3.0 | 500 | 500 | 38.0 | MAL/U |
| 2 | 21.5 | 300 | 4.0 | 320 | 800 | 86.0 | IND/G |
| 3* | 60.0 | 300 | 5.0 | 320 | 1000 | 69.7 | IND/G |
| 4 | 40.0 | 300 | 5.0 | 480 | 1200 | 93.3 | IND/G |
| 5 | 60.0 | 300 | 5.0 | 480 | 800 | 92.8 | IND/G |
| 6 | 80.0 | 300 | 5.0 | 480 | 480 | 92.7 | IND/G |
| 7 | 80.0 | 300 | 3.0 | 480 | 700 | 89.3 | IND/g |
| 8 | 150.0 | 275 | 5.0 | 480 | 700 | 80.2 | IND2/G/144 HRS |

TABLE 1-continued

RESULT OF EXTRACTION TRIALS

| EXPT | CASS g | TEMP °C. | TIME HRS | g NaOH | g H$_2$O | % EXTRACTION | CASS TYPE |
|---|---|---|---|---|---|---|---|
| 9* | 150.0 | 275 | 5.0 | 480 | 700 | 65.5 | IND2/G/64 HRS |

\* = KOH
MAL = MALAYSIAN ORE
IND = INDONESIAN ORE
G = GROUND ORE
U = UNGROUND ORE

I claim:

1. A method of making an alkali metal stannate which method comprises heating a mixture of mineral tin oxide with a solution of alkali under pressure.

2. A method as claimed in claim 1, wherein the mixture is heated at a temperature of at least 200° C.

3. A method as claimed in claim 1, wherein the alkali is sodium or potassium hydroxide.

4. A method as claimed in claim 1, wherein the solution of alkali is in water.

5. A method as claimed in any one of claim 1, wherein the solution contains 4–60% w/v of alkali hydroxide.

6. A method as claimed in claims 1, wherein the mixture contains 2 or more moles of alkali per mole of tin oxide.

7. A method as claimed in claim 1, further comprising separating the alkali metal stannate in solid form from supernatant solution.

* * * * *